United States Patent
Ding et al.

(10) Patent No.: US 11,097,239 B2
(45) Date of Patent: Aug. 24, 2021

(54) CORE-SHELL STRUCTURED NON-IONIC NANOEMULSION SYSTEM AND PREPARATION AND USE THEREOF

(71) Applicant: PetroChina Company Limited, Beijing (CN)

(72) Inventors: Bin Ding, Beijing (CN); Xiangfei Geng, Beijing (CN); Jianhui Luo, Beijing (CN); Yang Shi, Beijing (CN); Bo Huang, Beijing (CN); Jianyong Xie, Beijing (CN); Yang Gao, Beijing (CN); Pingmei Wang, Beijing (CN); Baoliang Peng, Beijing (CN)

(73) Assignee: PetroChina Company Limited, Beijing (CN)

( * ) Notice: Subject to any disclaimer, the term of this patent is extended or adjusted under 35 U.S.C. 154(b) by 0 days.

(21) Appl. No.: 16/691,946

(22) Filed: Nov. 22, 2019

(65) Prior Publication Data
US 2020/0206706 A1   Jul. 2, 2020

(30) Foreign Application Priority Data
Jan. 2, 2019 (CN) .......................... 201910001655.3

(51) Int. Cl.
*B01F 17/00* (2006.01)
*C09K 8/60* (2006.01)

(52) U.S. Cl.
CPC .......... *B01F 17/0021* (2013.01); *C09K 8/604* (2013.01); *C09K 2208/06* (2013.01)

(58) Field of Classification Search
None
See application file for complete search history.

(56) References Cited

U.S. PATENT DOCUMENTS

| 3,627,845 A | 12/1971 | Hickner et al. |
| 2011/0220839 A1* | 9/2011 | Wong .................. B01J 13/0008 252/62.51 R |

(Continued)

FOREIGN PATENT DOCUMENTS

| CN | 101108326 A | 1/2008 |
| CN | 102993413 | 3/2013 |

(Continued)

OTHER PUBLICATIONS

Shen Zhiqin et al; "Synthesis and Properties of Nonionic-anionic Gemini Surfactants with High Activity", Advances in Fine Petrochemicals, vol. 12, No. 9; dated Jun. 1, 2011; 5 pages.

(Continued)

*Primary Examiner* — Jeffrey D Washville
(74) *Attorney, Agent, or Firm* — Meunier Carlin & Curfman LLC

(57) ABSTRACT

The invention discloses a core-shell structured non-ionic nanoemulsion system and the preparation and use thereof. The system comprises a non-ionic gemini surfactant, an oil phase material, a solubilizer, and water; wherein the microemulsion has a core-shell structure, with the outer shell being the non-ionic Gemini surfactant, and the inner core being the oil phase material. The non-ionic Gemini surfactant is di(octylphenol polyoxyethylene ether)-substituted dicarboxylic acid diphenyl ether having the structural formula:

(Continued)

-continued

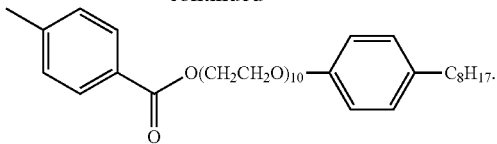

The non-ionic nanoemulsion system of the present invention is homogeneous and transparent, and has a spherical core-shell structure with nanometer-sized (3-40 nm) droplets, narrow particle size distribution, low tendency to agglomerate, good stability, and both an ultra-low interfacial tension and the ability to reduce viscosity of crude oil.

20 Claims, 7 Drawing Sheets

(56) References Cited

U.S. PATENT DOCUMENTS

| | | | |
|---|---|---|---|
| 2018/0024434 A1 | 1/2018 | Takemura et al. | |
| 2019/0177491 A1 | 6/2019 | Zhou et al. | |

FOREIGN PATENT DOCUMENTS

| | | | |
|---|---|---|---|
| CN | 103127744 | A | 6/2013 |
| CN | 104830301 | | 8/2015 |
| CN | 107304162 | | 10/2017 |
| CN | 107663449 | A | 2/2018 |
| CN | 108114617 | A | 6/2018 |
| JP | 2017141212 | | 8/2017 |
| WO | 2017151159 | A1 | 9/2017 |

OTHER PUBLICATIONS

Liu Qicheng et al; "Synthesis of 4, 4'-di ( n-dodecyl ) diphenyl ether", Chemical reagent, vol. 32, No. 12; 3 pages.
Office Action issued in CN application No. 201910001670.8; dated Mar. 15, 2021; 6 pages.
Search Report issued in CN application No. 201910001670.8; dated Mar. 8, 2021; 4 pages.
Chinese search report. dated Nov. 15, 2018. 8 pages.
Fan et al., Research Progress of Synthesis of Nonionic Gemini Surfactants, Science & Technology Review, vol. 28, No. 4.
Rong et al., Synthesis of Gemini Nonylphenol Polyethoxylate Surfactant, Petrochemical Technology,vol. 37,No. 10.
STN search.
C.A.Bunton, L.Robinson. Catalysis of nucleophilic substitutions by micelles of dicationic detergent [J]. F. J. Org. Chem, 1971(36): 2346-2352.
Y.P.Zhu, A. Masuyama, Deinega, Preparation and properties of double-or-triple—chain surfactants with two sulfonate groups derived from N-acyldiethanolamines [J]. J. Am. Oil Chem. Soc, 1991(68): 539-543.
Zhu Y P, Masuyama A, Okahara M. Preparation and surface active properties of amphipathic compounds with two sulfate groups and two lipophilic alkyl chains [J] J Am Oil Chem Soc,1990, 67(7): 459-463.
Zhu. Y P, Masuyama A, Kirito M. Preparation and surface-active properties of new amphipathic compounds with two phosphate groups and two long-chain alkyl groups [J] J Am Oil Chem Soc, 1991, 68(4): 268-271.
Menger F M,Littau CA. Gemini surfactants: synthesis and properties[J]. J. Am Chem Soc, 1991(113): 1451-1452.
Rosen, MJ. Geminis: A new Generation of surfactants. [J] J Chem Technol, 1993(30): 23-33.
Zana R,Talmon Y. Dependence of aggregate morphology on structure of dimeric surfactants. [J] Nature, 1993(362): 228-229.
Search Report issued in CN Application No. 201910001655.3 dated Sep. 21, 2020; 4 pages.
Office Action issued in CN Application CN 201910001655.3 dated Sep. 21, 2020; 11 pages.

* cited by examiner

CORE-SHELL STRUCTURED NON-IONIC NANOEMULSION SYSTEM AND PREPARATION AND USE THEREOF

CROSS-REFERENCE TO RELATED APPLICATION

This application claims priority to Chinese Patent Application No. 201910001655.3, filed on Jan. 2, 2019, which is hereby incorporated by reference in its entirety.

TECHNICAL FIELD

The invention relates to the technical field of microemulsion, in particular to a core-shell structured non-ionic nanoemulsion system and the preparation and use thereof.

BACKGROUND

Microemulsion is prepared from surfactants, cosurfactants, water, and oil in a certain ratio, having a droplet size of 1 to 300 nm. Compared with ordinary emulsions, a microemulsion is transparent or semitransparent in appearance, has a smaller particle size and better fluidity, and represents a homogeneous stable system, not tending to coagulate or phase separate after long-term storage. Due to the small size and large number of droplets, a microemulsion system has a large specific surface area and strong interfacial activity, and thus it has been widely used in the field of daily chemical industry, light industry, petroleum exploitation and the like.

High energy methods are the traditional methods for preparing microemulsions, which is basically known to forcibly emulsify the water phase and oil phase containing surfactants and cosurfactants by means of high shear rate, high power ultrasonication and the like. With conventional homogenizers, colloid mills, stirring machines and other equipment, an emulsion system at mere micron scale may be obtained. Large droplets in the emulsion have to be broken down to nano-sized smaller droplets in a high-energy manner by using specialized equipment such as high-pressure homogenizers and high-power ultrasonicators; this equipment is expensive, while the production cost is high and the microemulsion thus obtained has poor stability.

With the continuous breakthrough in technologies in surfactant research and development, the techniques of preparing microemulsion by low energy processes, including dilution, phase transition temperature and emulsification, are gaining much attention. Among them, surfactants are essential to the low energy processes. Microemulsion particles or droplets are formed in a short time with the strong interfacial activities of surfactants, and a laminar or double continuous layer is formed under the conditions of dilution, critical phase transition temperature, self-emulsification and the like, and the oil phase material is effectively encapsulated, to achieve a small-sized droplet state, such that a nano-scale microemulsion system is finally obtained. However, conventional aqueous surfactants lack diversity in molecular structure and has poor interfacial activity, the microemulsion system formed has large particle size and uncontrollable droplet morphology, and the system is disadvantageous in poor dispersibility and serious agglomeration. In addition, a low-energy reaction requires finely controlled reaction conditions and has a strict requirement for the reaction system (temperature, pH, humidity, feeding sequence, stirring speed, etc.), but current process conditions cannot meet the demands in industrial production, and the application of microemulsion technologies in the field of petroleum exploitation is significantly limited. Therefore, it is a critical technical problem that needs to be resolved to develop a low-cost nano-microemulsion system having a core-shell structure, small particle size, narrow distribution, and good stability, with a simple and feasible preparation process.

SUMMARY OF THE INVENTION

In order to solve at least one of the above technical problems, the present invention provides a core-shell structured non-ionic nanoemulsion system and the preparation and use thereof. The non-ionic nanoemulsion system of the present invention is homogeneous and transparent, and has a spherical core-shell structure with nanometer-sized (3-40 nm) droplets, narrow particle size distribution, low tendency to agglomerate, good stability, and both an ultra-low interfacial tension and the ability to reduce viscosity of crude oil. The preparation process according to the invention has a simple procedure and low requirement for equipment, and is suitable for industrial production at a low overall cost, which is promising for application in the field of petroleum industry.

To achieve the above objectives, the present invention provides the following technical solutions.

In one aspect, the present invention provides a core-shell structured non-ionic nanoemulsion system which comprises: a non-ionic Gemini surfactant, an oil phase material, a solubilizer, and water;

wherein, the microemulsion has a core-shell structure as shown in FIG. 1, with the outer shell being the non-ionic Gemini surfactant, and the inner core being the oil phase material; and the non-ionic Gemini surfactant is di(octylphenol polyoxyethylene ether)-substituted dicarboxylic acid diphenyl ether having a structural formula of:

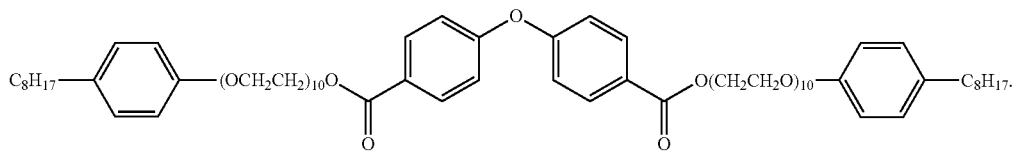

Preferably, in accordance with a particular embodiment of the present invention, the core-shell structure non-ionic nanoemulsion system is a homogeneous and transparent non-ionic microemulsion system, wherein the microemulsion has a spherical core-shell structure, and the microemulsion has a droplet size distribution of 3 nm to 40 nm. The water may be distilled water, deionized water, or an inorganic salt brine.

When the water is an inorganic salt brine, the non-ionic nanoemulsion system of the present invention further comprises an inorganic salt. Preferably, the inorganic salt has a mass content of 0 to 20%, not including 0; preferably 1% to 5%. More preferably, the inorganic salt is NaCl.

Preferably, the microemulsion has an effective concentration of 0.05% to 0.5%, which is the total concentration of the non-ionic Gemini surfactant, the oil phase material, and the solubilizer; preferably 0.1% to 0.3%.

Further preferably, the non-ionic Gemini surfactant accounts for 10% to 75% by mass, the oil phase material accounts for 5% to 25%, and the solubilizer accounts for 10% to 32%.

The oil phase material is one or more of an aromatic hydrocarbon compound, a heterocyclic compound, and a terpene compound.

Preferably, the oil phase material is one or more of xylene, pyrrolidone, menthol, alpha-pinene, beta-laurene, and limonene.

The solubilizer is one or more of small molecule alcohol compounds.

Preferably, the solubilizer is one or more of ethanol, propanol, isopropanol, ethylene glycol, butanol, and pentanol.

In the core-shell structured non-ionic nanoemulsion system of the present invention, the di(octylphenol polyoxyethylene ether)-substituted dicarboxylic acid diphenyl ether non-ionic Gemini surfactant is a novel surfactant which is disclosed in the present invention for the first time. This target product has not been reported in the literature so far. The invention also provides the synthesis method of this non-ionic gemini surfactant, which has synthesis steps consisting of an acyl chlorination reaction and a one-step esterification reaction, mild reaction conditions, simple procedure, and products easily separated and purified. Specifically, the reaction scheme is as follows:

oxalyl chloride method, the phosphorus trichloride method, the phosphorus pentachloride method, etc. Among them, preparation of acyl chlorides with chlorosulfoxide can be conducted at a mild reaction condition, at room temperature or with slight heating. The products are all gases except for the acyl chlorides, which can often be used without purification, with high purity and high yield. In the Examples of the invention, the dichlorosulfoxide method is preferably adopted, and in particular, 4,4'-dicarboxylic acid diphenyl ether is subjected to a chlorination reaction with dichlorosulfoxide so as to obtain 4,4'-diformyl chloride diphenyl ether.

Further, the process of the acyl chlorination reaction of 4,4'-dicarboxylic acid diphenyl ether with dichlorosulfoxide comprises:

adding 4,4'-dicarboxylic acid diphenyl ether and N,N-dimethylformamide (DMF, catalyst) to a solvent, followed by dropwise addition of dichlorosulfoxide into the reaction system, and carrying on the reaction after completion of the dropwise addition; concentrating the reaction mixture after completion of the reaction to dryness to give a brown solid intermediate 4,4'-diformyl chloride diphenyl ether, which is used directly in the subsequent reaction.

As the catalyst for the acyl chlorination reaction, NN-dimethylformamide may be used in a catalytic amount for a normal reaction with no strict requirement. In a preferred example of the present invention, the molar ratio of 4,4'-dicarboxylic acid diphenyl ether to DMF is 1: (0.1-0.2). In addition, the catalyst which can be used in the acyl chlorination with dichloro-sulfoxide may be N,N-dimethylaniline, pyridine, or the like.

Various solvents can be used in the reaction, a single solvent of dichloromethane, trichloromethane, benzene,

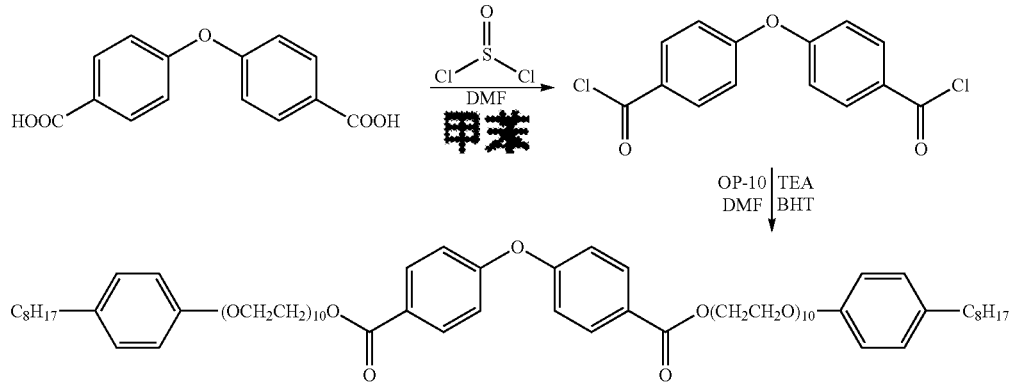

The synthesis steps include:
1) subjecting 4,4'-dicarboxylic acid diphenyl ether to an acyl chlorination reaction to obtain 4,4'-diformyl chloride diphenyl ether;
2) subjecting 4,4'-diformyl chloride diphenyl ether to an esterification reaction with octylphenol polyoxyethylene ether (OP-10) to obtain the target product di(octylphenol polyoxyethylene ether)-substituted dicarboxylic acid diphenyl ether.

Each step is described in more details as follows.
1) 4,4'-dicarboxylic acid diphenyl ether is subjected to an acyl chlorination reaction to obtain 4,4'-diformyl chloride diphenyl ether.

There are various methods for acyl chlorination of carboxylic acids, such as the dichlorosulfoxide method, the toluene or the like or a mixed solvent thereof is generally used. In a preferred example of the present invention, toluene is used as the solvent for the acyl chlorination reaction.

Preferably, dichlorosulfoxide is used in an amount that is slightly excessive with respect to the carboxylic acid in order to ensure the chlorination as complete as possible. In the present invention, the molar ratio of 4,4'-dicarboxylic acid diphenyl ether to dichlorosulfoxide is 1: (2.1 to 2.2). The process of acyl chlorination is rather intense, and thus dichlorosulfoxide needs to be slowly and dropwise added into the reaction, preferably controlled at 1 to 2 drops/sec. If the temperature of the system is high during the dropwise addition, the addition rate should be further slowed down. Experimental personnel may adjust the specific dropwise addition rate according to the experimental situation during operation while attending to the safety of the experiment.

Preferably, in order to reduce by-products and improve the reaction yield, the acyl chlorination reaction is carried out under a protective gas atmosphere. More preferably, the protective gas includes nitrogen and inert gases. The inert gases are for example helium and argon.

Preferably, after the dropwise addition of dichlorosulfoxide is completed, the reaction is resumed at an elevated temperature. Here, the temperature is elevated to accelerate the reaction rate, and since the reaction per se is a rather fast reaction, it may be conducted at room temperature or with slight heating and the specific heating temperature can be adjusted according to the specific solvent chosen. In a preferable example of the present invention, the reaction is carried out with the temperature raised to 70° C.

2) 4,4'-diformyl chloride diphenyl ether is subjected to an esterification reaction with OP-10 to obtain the target product di(octylphenol polyoxyethylene ether)-substituted dicarboxylic acid diphenyl ether.

Preferably, the step 2) comprises:
dissolving 4,4'-diformyl chloride diphenyl ether in a first solvent to obtain a first solution;
adding OP-10, NN-dimethylformamide, triethylamine, and an antioxidant 2,6-di-tert-butyl-4-methylphenol to a second solvent to obtain a second solution;
dropwise adding the first solution slowly into the second solution to carry out an esterification reaction; and
after completion of the reaction, performing a post-treatment purification to obtain the target product di(octylphenol polyoxyethylene ether)-substituted dicarboxylic acid diphenyl ether.

Here, the first solvent and the second solvent may be selected from a plurality of commonly used organic solvents, and may be the same or different. Preferably, the first solvent is dichloromethane. Preferably, the second solvent is also dichloromethane.

In this reaction, OP-10 is used in an amount that is slightly excessive with respect to the acyl chloride in order to ensure that as much acyl chloride is esterified and linked to the surfactant OP-10 as possible. Preferably, the molar ratio of OP-10 to 4,4'-diformyl chloride diphenyl ether is (2.1 to 2.2): 1.

Preferably, the molar ratio of N,N-dimethylformamide to 4,4'-diformyl chloride diphenyl ether is (0.1 to 0.2): 1.

Preferably, the molar ratio of triethylamine as a base to 4,4'-diformyl chloride diphenyl ether is (2.1 to 2.2): 1.

Preferably, the molar ratio of 2,6-di-tent-butyl-4-methylphenol (BHT) as an antioxidant to 4,4'-diformyl chloride diphenyl ether is (0.1 to 0.2): 1. During the reaction, BHT is first esterified with acyl chloride and then substituted by the OP-10 alcohol to prevent self-condensation of the raw material.

In a preferred embodiment of the invention, the step 2) comprises in particular:
dissolving 1 molar equivalent of 4,4'-diformyl chloride diphenyl ether in a solvent to obtain a first solution;
adding and dissolving 2.1 to 2.2 molar equivalent of OP-10, 0.1 to 0.2 molar equivalent of N,N-dimethylformamide (DMF), 2.1 to 2.2 molar equivalent of triethylamine (TEA) and 0.1 to 0.2 molar equivalent of the antioxidant 2,6-di-tert-butyl-4-methylphenol (BHT) into a second solvent to obtain a second solution;
dropwise adding the first solution slowly into the second solution to carry out an esterification reaction; and
after completion of the reaction, performing a post-treatment purification to obtain the target product di(octylphenol polyoxyethylene ether)-substituted dicarboxylic acid diphenyl ether.

Preferably, the post-treatment purification comprises: quenching with water, liquid separation, recovery of the organic phase, concentrating to dryness, and column chromatography purification, thereby obtaining the target product.

Preferably, the developing solvent for the column chromatography purification is a system of petroleum ether and ethyl acetate. More preferably, V (petroleum ether): V (ethyl acetate)=10: 1.

In the above synthesis method of the non-ionic Gemini surfactant, the reaction end point is always monitored with TLC.

A second aspect of the invention provides a preparation method of the above non-ionic nanoemulsion system, the method comprising:

S1, mixing a non-ionic Gemini surfactant, an oil phase material, a solubilizer, and water uniformly to obtain a homogeneous mixed solution; or mixing a non-ionic Gemini surfactant, an oil phase material, and a solubilizer uniformly to obtain a homogeneous mixed solution;

S2, diluting the homogeneous mixed solution with water or an inorganic salt brine to a low concentration condition, so as to obtain the core-shell structured non-ionic nanoemulsion system.

Preferably, the homogeneous mixed solution in S1 comprises by mass: 10% to 60% of the non-ionic Gemini surfactant, 5% to 20% of the oil phase material, 10% to 25% of the solubilizer, and balance of water. There is no particular requirement for the order of the addition of the non-ionic Gemini surfactant, the oil phase material, and the solubilizer. There is no particular requirement in S2 for the order of the addition of water or the inorganic salt brine and the mixed solution obtained in S1, and the core-shell structure non-ionic nanoemulsion system of the present invention is obtained upon stirring and uniform mixing.

Preferably, the low concentration condition is an effective microemulsion concentration of 0.05% to 0.5%, i.e. a total concentration of the non-ionic Gemini surfactant, the oil phase material, and the solubilizer; preferably 0.1% to 0.3%.

Preferably, the mixing and dilution are carried out under stirring at 10 rpm to 400 rpm, preferably 100 rpm to 300 rpm.

A non-ionic nanoemulsion system having a core-shell structure is precisely constructed in the present invention by introducing a small moleculenon-ionic Gemini surfactant, di(octylphenol polyoxyethylene ether)-substituted dicarboxylic acid diphenyl ether, which is characterized in that: 1) at a low concentration condition (0.05% to 0.5%), the non-ionic microemulsion system is homogeneous and transparent, has a spherical core-shell structure with a particle size of 3 nm to 40 nm and excellent stability; 2) the non-ionic microemulsion system has a simple preparation process, which greatly reduces operating cost, and it has stable quality and is available for industrialized production; 3) the non-ionic nanoemulsion system has ultra-low interfacial tension and the ability of reducing of crude oil viscosity, and can be used for the exploitation of low permeability, extra/ultra-low permeability, dense, and shale oils and gases.

In a preferred embodiment of the present invention, the method for preparing the above non-ionic nanoemulsion system mainly comprises the steps of:

(1) mixing the di(octylphenol polyoxyethylene ether)-substituted dicarboxylic acid diphenyl ether non-ionic Gemini surfactant, oil phase material and solubilizer in the preferred ratio described above under stirring until completely dissolved, so as to obtain a homogeneously mixed solution;

(2) diluting the homogeneously mixed solution prepared in step (1) with water or an inorganic salt brine under agitation to a low concentration condition (0.05% to 0.5%, preferable 0.1% to 0.3%) until complete dissolution, so as to obtain a spherical core-shell structured non-ionic nanoemulsion system.

In an example of the invention, it is confirmed by TEM that the non-ionic nanoemulsion system has a core-shell structure.

The third aspect of the invention provides the use of the above non-ionic nanoemulsion system in the exploitation of low permeability, extra/ultra-low permeability, dense, and shale oils and gases.

In an example of the invention, at 80° C., the prepared core-shell structured non-ionic nanoemulsion system has an interfacial tension with kerosene of 0.005 mN/m, and has an interfacial tension with a particular crude oil from Xinjiang (with an apparent viscosity of 18 mPa·s) of 0.025 mN/m, showing substantial superiority.

In an example of the invention, the prepared core-shell structured non-ionic nanoemulsion system has an average viscosity reduction efficiency of 58% for a particular crude oil from Xinjiang, and therefore has a good viscosity-reducing effect and shows substantial superiority.

The present invention has the following advantages and effects over the prior art:

1) a non-ionic Gemini surfactant, di(octylphenol polyoxyethylene ether)-substituted dicarboxylic acid diphenyl ether, is introduced in the present invention to construct a core-shell structured non-ionic nanoemulsion system, with friendly reaction conditions and simple preparation process that is available for large-scale industrialized production, which completely solves the challenging technical problem that microemulsion systems prepared at low energy condition tend to agglomerate and have poor stability.

2) A non-ionic microemulsion system having a spherical core-shell structure is obtained in the present invention, with a small emulsion particle size (3 nm to 40 nm), narrow particle size distribution, low tendency to agglomerate and improved stability.

3) The core-shell structured non-ionic nanoemulsion system obtained in the present invention has an ultra-low interfacial tension and crude oil viscosity-reducing ability, with the oil material in the inner phase replaceable, and can be used for in the exploitation of low permeability, extra/ultra-low permeability, dense, and shale oils and gases, and thus has a broad application prospect.

BRIEF DESCRIPTION OF THE ACCOMPANYING DRAWINGS

DETAILED DESCRIPTION OF THE INVENTION

In order to more clearly illustrate the present invention, the present invention will be further described in connection with prefer examples. It will be understood by those skilled in the art that the following detailed description is illustrative and not limiting, and should not be construed as limitation to the scope of the invention.

Preparation of di(octylphenol polyoxyethylene ether)-substituted dicarboxylic acid diphenyl ether (1) Synthesis of 4,4'-diformyl chloride diphenyl ether In a three-necked flask placed in a constant temperature water bath and equipped with a stirrer, 2 g (7.75 mmol) of 4,4'-dicarboxylic acid diphenyl ether and 0.113 g (1.55 mmol) of DMF (catalyst) were added, and 50 mL of toluene as solvent was further added under nitrogen protection. Then, 2.03 g (17.04 mmol) of dichlorosulfoxide was slowly added dropwise and stirred. After completion of the dropwise addition, the temperature was raised to 70° C., and the reaction was carried out for 4 h (the end point of the reaction was monitored by TLC). After completion of the reaction, the reaction was concentrated to dryness to give a brown solid intermediate, 4,4'-diformyl chloride diphenyl ether which was used directly in the subsequent reaction.

(2) Synthesis of di(octylphenol polyoxyethylene ether)-substituted dicarboxylic acid diphenyl ether 2.7 g (9.15 mmol) of 4,4'-diformyl chloride diphenyl ether was dissolved in a certain amount of methylene chloride. 13.02 g (20.13 mmol) OP-10, 0.134 g (1.83 mmol) DMF, 2.04 g (20.13 mmol) TEA (triethylamine) and 0.403 g (1.83 mmol) of the antioxidant BHT (2,6-di-tent-butyl-4-methylphenol) were added into a three-necked flask equipped with a stirrer, into which a certain amount of methylene chloride was added for dissolution. The methylene chloride solution of 4,4'-diformyl chloride diphenyl ether was slowly added dropwise into the three-necked flask, and the reaction was carried out at room temperature for 4 h (the end point of the reaction was monitored by TLC). After completion of the reaction, the mixture was subjected to quenching with water, liquid separation, organic phase recovering, and concentration to dryness, and then purified on a column (column chromatography condition: V (petroleum ether): V (ethyl acetate) EA=10:1) to give 8.3 g (5.49 mmol) of a brown oil-like product, di(octylphenol polyoxyethylene ether)-substituted dicarboxylic acid diphenyl ether.

Figure 1:
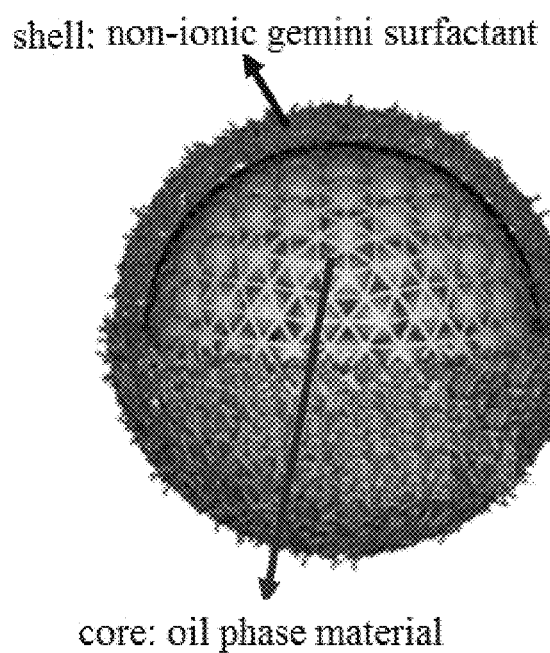
FIG. 1 is a schematic view of the structure of a microemulsion of the present invention.
Figure 2:
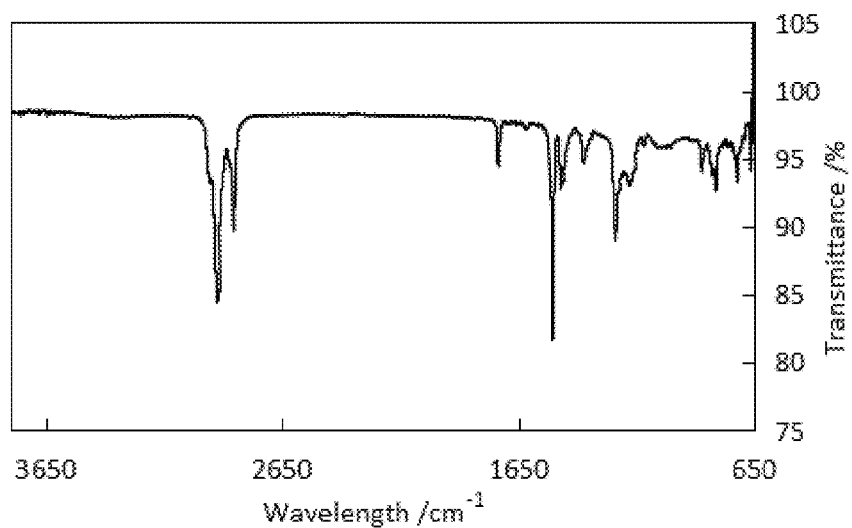
FIG. 2 is an infrared spectrum of di(octylphenol polyoxyethylene ether)-substituted dicarboxylic acid diphenyl ether.

Infrared spectrum of di(octylphenol polyoxyethylene ether)-substituted dicarboxylic acid diphenyl ether The infrared spectrum of the obtained target product is shown in FIG. 2, and it is determined upon spectrum resolution: 2924, 2848 are $CH_3$, $CH_2$ stretching vibration peaks; 1501, 1466 are vibration peaks of the benzene ring skeleton; 872, 811 are characteristic peaks of the para-position substitution on benzene ring; 1728 is C=O stretching vibration peak; 1105 is C—O stretching vibration peak.

Figure 3:
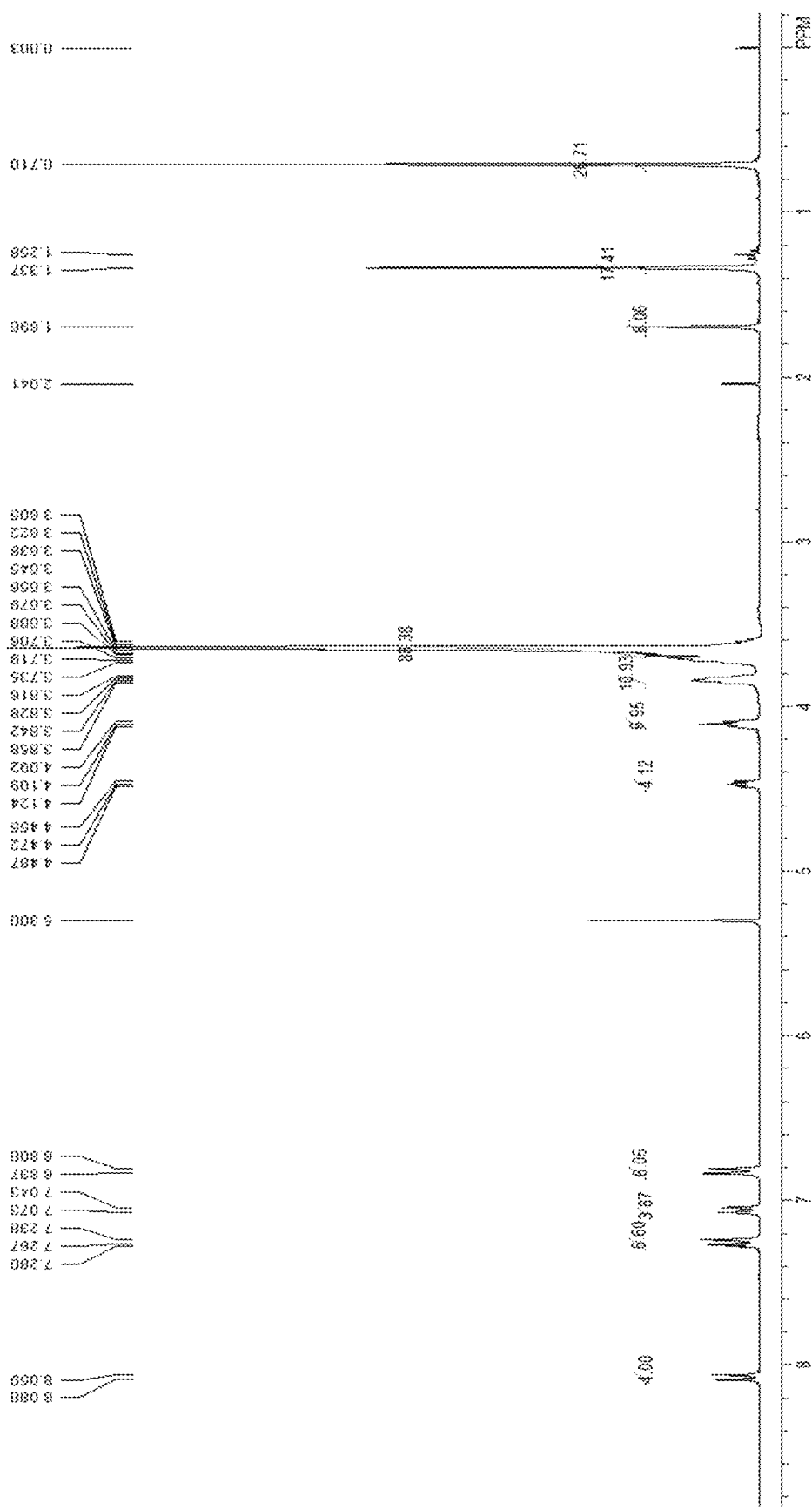
FIG. 3 is a $^1$H-NMR spectrum of di(octylphenol polyoxyethylene ether)-substituted dicarboxylic acid diphenyl ether.

$^1$H-NMR spectrum of di(octylphenol polyoxyethylene ether)-substituted dicarboxylic acid diphenyl ether The $^1$H-NMR spectrum of the obtained target product is shown in FIG. 3, and it is determined upon spectrum resolution:

$^1$H-NMR (400 MHz , $CDCl_3$): δ: 0.71 [3H, $CH_3CH_2$], 1.25-1.33 [10H, $CH_3(CH_2)_5CH_2CH_2$], 1.69 [2H, $(CH_3(CH_2)_5CH_2CH_2]$, 2.04 [2H, $CH_3(CH_2)_5CH_2CH_2$], 3.60-3.68 [16H, $(CH_2CH_2O)_8CH_2CH_2OC$], 3.70-3.73 [2H, $(CH_2CH_2O)_8CH_2CH_2OC$], 3.81-3.85 [2H, $(CH_2CH_2O)_8CH_2CH_2OC$], 4.09-4.12 [2H, $COOCH_2CH_2O(CH_2CH_2O)_8$], 4.45-4.48 [2H, $COOCH_2CH_2O(CH_2CH_2O)_8$], 7.04-7.28 [1H, CHCHCCOO], 8.05-8.08 [1H, CHCHCCOO].

Figure 4:
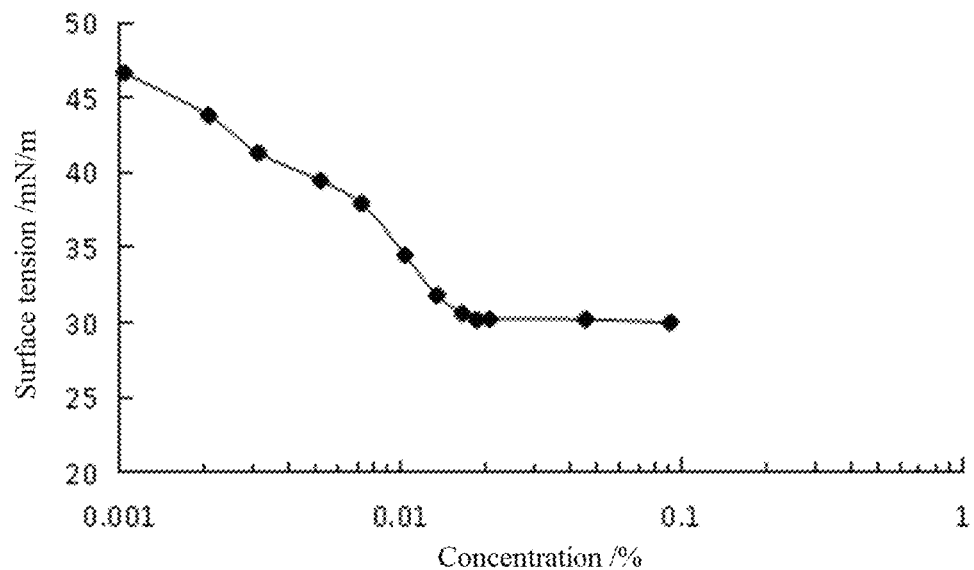
FIG. 4 is a graph of surface tension versus concentration (25° C.) of di(octylphenol polyoxyethylene ether)-substituted dicarboxylic acid diphenyl ether.

Determination of Surface Activity of di(octylphenol polyoxyethylene ether)-substituted dicarboxylic acid diphenyl ether The ability of a surfactant to reduce water surface tension is an important parameter in evaluating its surface activity. The surface tension of target aqueous solutions at different concentrations at 25° C. was determined by the hanging plate method, and a concentration-dependent curve of the surface tension of aqueous solutions of the di(octylphenol polyoxyethylene ether)-substituted dicarboxylic acid diphenyl ether Gemini surfactant was plotted (FIG. 4). The surface activity parameters of the Gemini surfactant could be determined from this curve, with a critical micelle concentration (cmc) of 0.01 wt % and a surface tension at the critical micelle concentration ($\gamma_{cmc}$) of 30 mN/m.

Example 1

This example provides a core-shell structured non-ionic nanoemulsion system and a preparation method thereof. The main preparation steps and test results are as follows.

(1) In parts by weight, 5 parts of xylene, 60 parts of di(octylphenol polyoxyethylene ether)-substituted dicarboxylic acid diphenyl ether non-ionic Gemini surfactant, 25 parts of isopropanol, and 10 parts of water were weighed and mixed in a reactor under stirring at 300 rpm until completely dissolved, and a homogeneously mixed solution was obtained.

(2) In parts by weight, 0.3 parts of the above homogeneously mixed solution and 99.8 parts of water were weighed and mixed in a reactor under stirring at 300 rpm until completely dissolved, and a core-shell structured non-ionic nanoemulsion system having an effective concentration of 0.27% with a uniform and transparent appearance was obtained and stayed stable for a long time.

Figure 5:
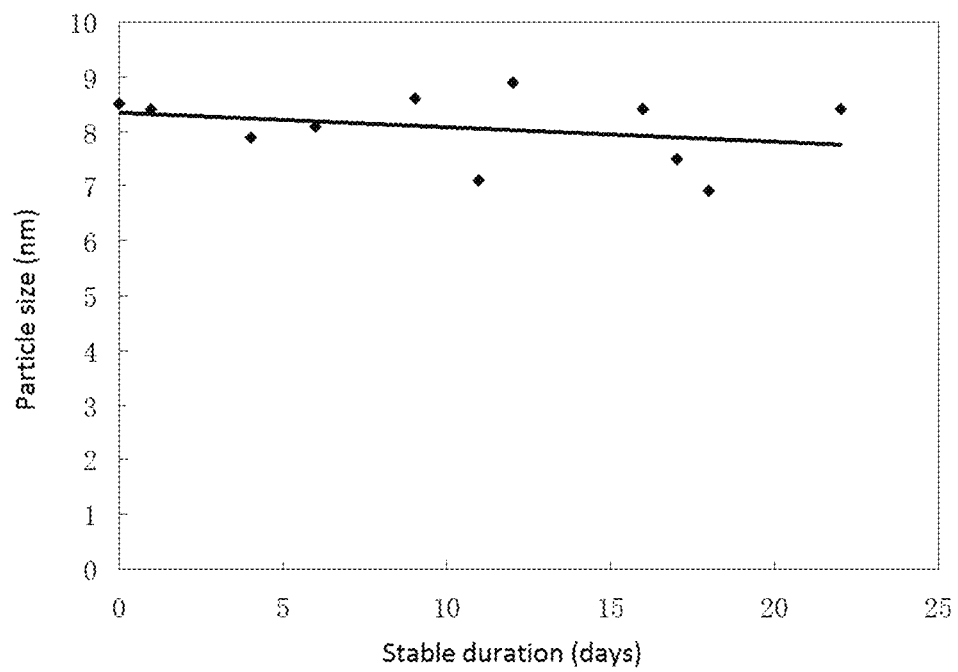
FIG. 5 is a graph showing the average particle size distribution over time of the non-ionic nanoemulsion prepared in Example 1.

(3) The microemulsion had an initial average particle size of 8.5 nm, and an average particle size of 8.4 nm after being stable for 22 days, as determined by dynamic light scattering (BI-200SM, Brookhaven Inc.) at the 90° condition (see FIG. 5).

Example 2

This example provides a core-shell structured non-ionic nanoemulsion system and a preparation method thereof. The main preparation steps and test results are as follows.

(1) In parts by weight, 10 parts of pyrrolidone, 50 parts of di(octylphenol polyoxyethylene ether)-substituted dicarboxylic acid diphenyl ether non-ionic Gemini surfactant, 20 parts of butanol, and 20 parts of water were weighed and mixed in a reactor under stirring at 300 rpm until completely dissolved, and a homogeneously mixed solution was obtained.

(2) In parts by weight, 0.2 parts of the above homogeneously mixed solution, 98.8 parts of water, and 1 part of NaCl were weighed and mixed in a reactor under stirring at 300 rpm until completely dissolved, and a core-shell structured non-ionic nanoemulsion system having an effective concentration of 0.16% with a uniform and transparent appearance was obtained and stayed stable for a long time.

Figure 6:
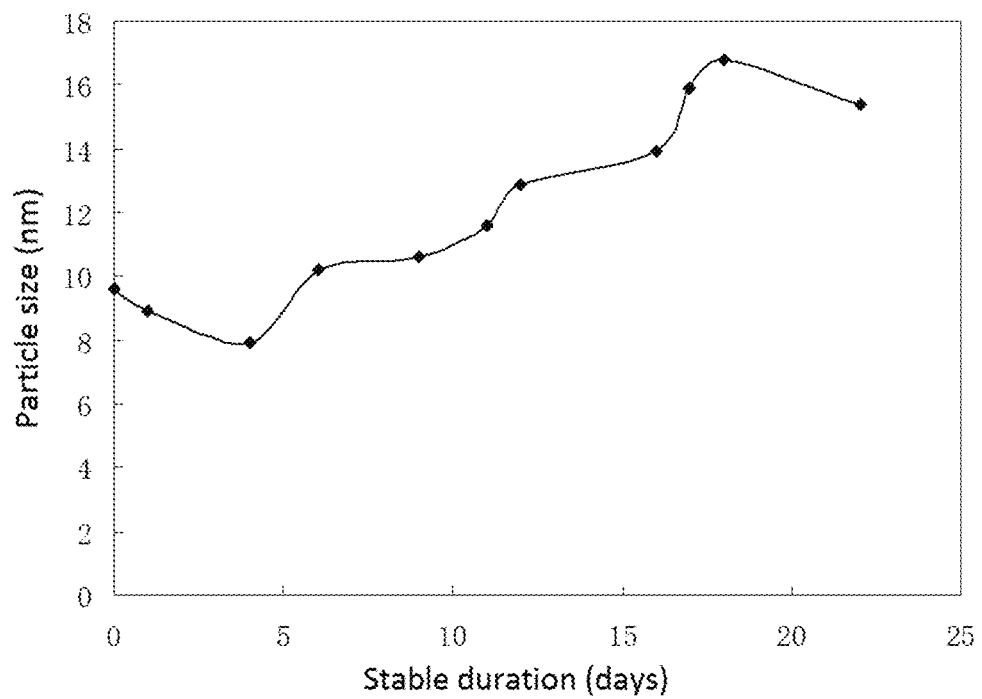
FIG. 6 is a graph showing the average particle size distribution over time of the non-ionic nanoemulsion prepared in Example 2.

(3) The microemulsion had an initial average particle size of 9.6 nm, and an average particle size of 15.4 nm after being stable for 22 days, as determined by dynamic light scattering (BI-200SM, Brookhaven Inc.) at the 90° condition (see FIG. 6).

Example 3

This Example provides a core-shell structured non-ionic nanoemulsion system and a preparation method thereof. The main preparation steps and test results are as follows.

(1) In parts by weight, 10 parts of menthol, 55 parts of di(octylphenol polyoxyethylene ether)-substituted dicarboxylic acid diphenyl ether non-ionic Gemini surfactant, 25 parts of ethanol, and 10 parts of water were weighed and mixed in a reactor under stirring at 300 rpm until completely dissolved, and a homogeneously mixed solution was obtained.

(2) In parts by weight, 0.1 part of the above homogeneously mixed solution, 94.9 parts of water, 5 parts of NaCl were weighed and mixed in a reactor under stirring at 300 rpm until completely dissolved, and a core-shell structured non-ionic nanoemulsion system having an effective concentration of 0.1% with a uniform and transparent appearance was obtained and stayed stable for a long time.

Figure 7:
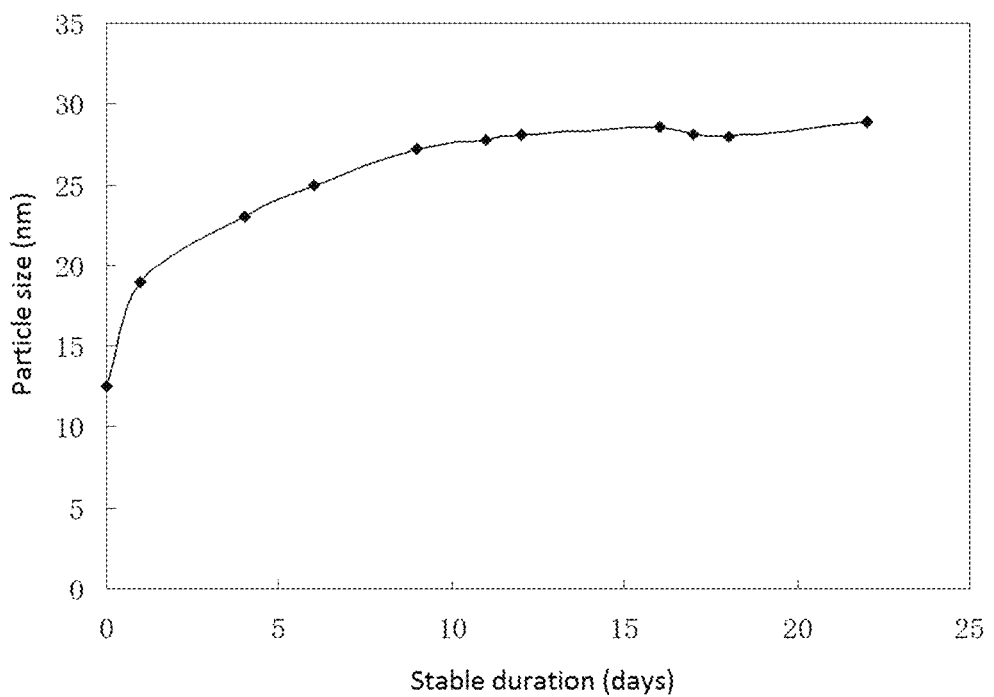
FIG. 7 is a graph showing the average particle size distribution over time of the non-ionic nanoemulsion prepared in Example 3.

(3) The microemulsion had an initial average particle size of 12.5 nm, and an average particle size of 28.9 nm after being stable for 22 days, as determined by dynamic light scattering (BI-200SM, Brookhaven Inc.) at the 90° condition (see FIG. 7).

Example 4

This Example provides a core-shell structured non-ionic nanoemulsion system and a preparation method thereof. The main preparation steps and test results are as follows.

(1) In parts by weight, 20 parts of α-pinene, 55 parts of di(octylphenol polyoxyethylene ether)-substituted dicarboxylic acid diphenyl ether non-ionic Gemini surfactant, and 25 parts of isopropanol were weighed and mixed in a reactor under stirring at 300 rpm until completely dissolved, and a homogeneously mixed solution was obtained.

Figure 8:
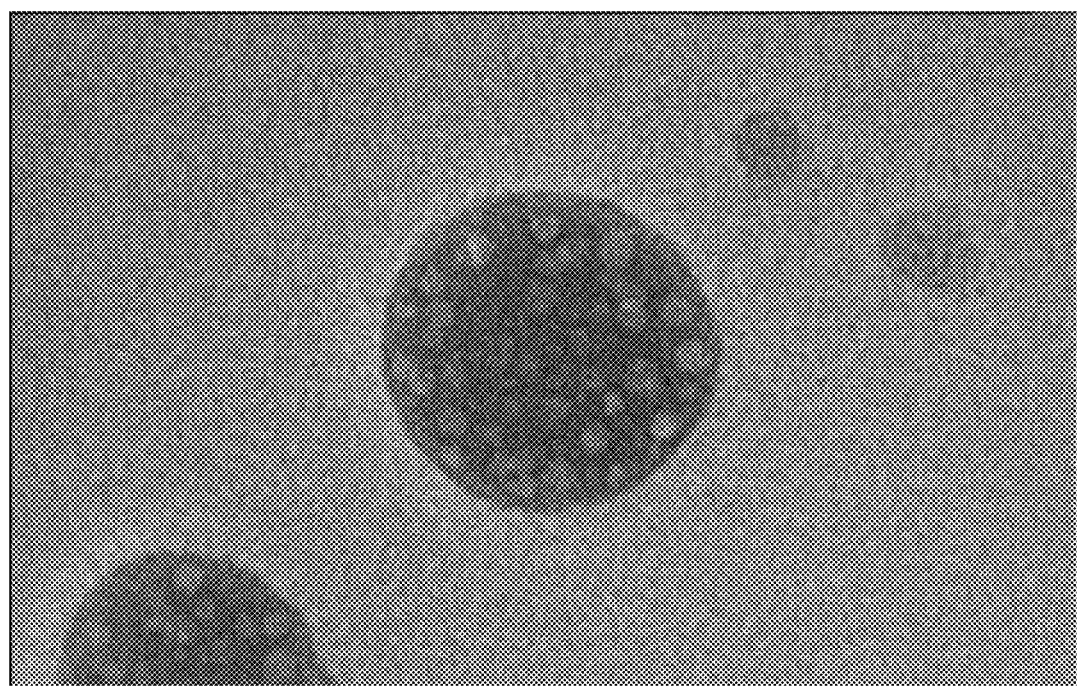
FIG. 8 is a TEM image of a non-ionic nanoemulsion at a concentration of 0.1% by mass prepared in Example 4.

(2) In parts by weight, 0.1 part of the above homogeneously mixed solution, 94.9 parts of water, and 5 parts of NaCl were weighed and mixed in a reactor under stirring at 300 rpm until completely dissolved, and a core-shell structured non-ionic nanoemulsion system having an effective concentration of 0.1% with an uniform and transparent appearance was obtained and stayed stable for a long time. The microemulsion system at a mass concentration of 0.1% was demonstrated by transmission electron microscopy (HT7700, HITACHI, Japan) to have a spherical core-shell structure (see FIG. 8).

(3) In parts by weight, 0.3 part of the above homogeneously mixed solution, 94.7 parts of water, and 5 parts of NaCl were weighed and mixed in a reactor under stirring at 300 rpm until completely dissolved, and a core-shell structured non-ionic nanoemulsion system having an effective concentration of 0.3% with an uniform and transparent appearance was obtained and stayed stable for a long time.

Figure 9:
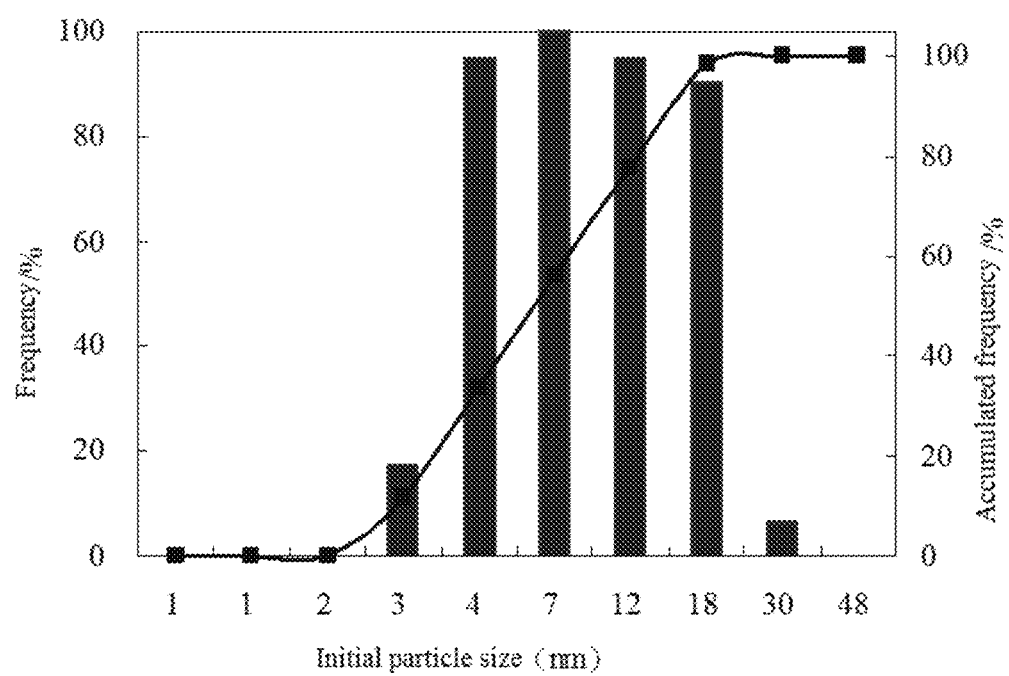
FIG. 9 is a graph showing the initial particle size and the distribution of a non-ionic nanoemulsion at a concentration of 0.1% by mass prepared in Example 4.
Figure 10:
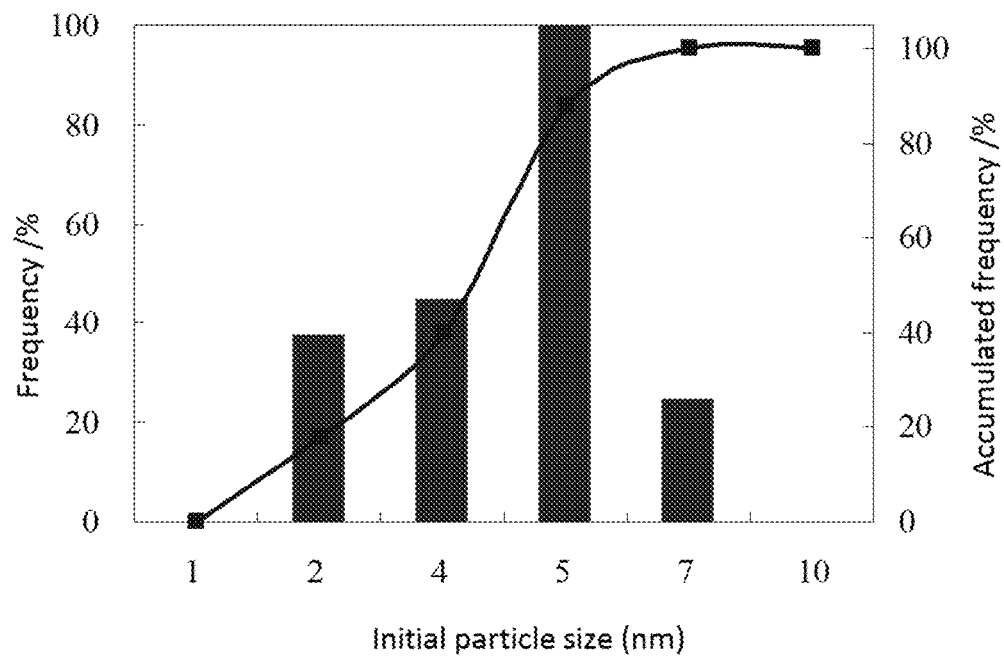
FIG. 10 is a graph showing the initial particle size and the distribution of a non-ionic nanoemulsion at a concentration of 0.3% by mass prepared in Example 4.
Figure 11:
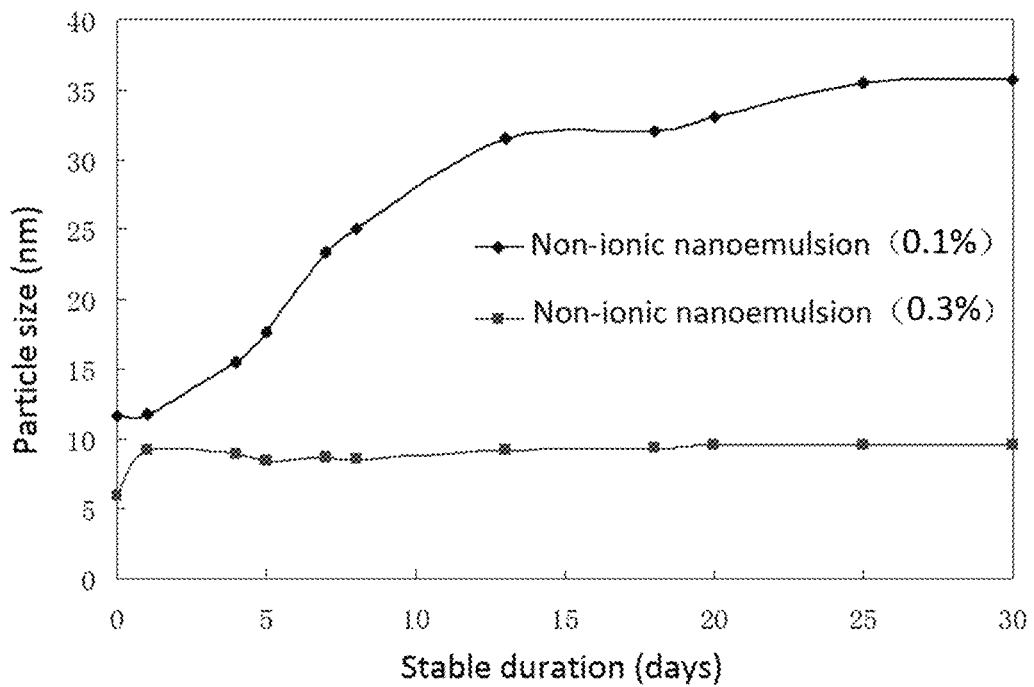
FIG. 11 is a graph showing the average particle size distribution over time of the non-ionic nanoemulsions prepared in Example 4.

(4) The non-ionic nanoemulsions at a mass concentration of 0.1% and 0.3% had an initial particle size of 11.6 nm and 6.0 nm respectively with narrow particle size distribution, as determined by dynamic light scattering (BI-200SM, Brookhaven Inc.) at the 90° condition (see FIGS. 9 and 10). After being stable for 30 days, the average particle sizes were 35.8 nm and 9.5 nm (see FIG. 11). Both non-ionic nanoemulsion systems have a particle size of less than 40 nm, with the non-ionic nanoemulsion at the mass concentration of 0.3% having a particle size that is consistantly smaller than 10 nm, together with minimal variation and excellent stability, showing substantial superiority.

Example 5

This Example provides evaluation of the major properties of the core-shell structured non-ionic nanoemulsion system, and detailed results are shown as follows.

(1) As determined by a TX500C rotary drop interface force meter, the non-ionic nanoemulsion systems having a mass concentration of 0.1% and 0.3% prepared in Example 4 had an interfacial tension with kerosene at 80 ° C. of 0.009 mN/m and 0.005 mN/m, respectively. These experimental results suggest the non-ionic nanoemulsion system has ultra-low interfacial tension, showing substantial superiority.

(2) As determined by a TX500C rotary drop interface force meter, the non-ionic nanoemulsion systems having a mass concentration of 0.1% and 0.3% prepared in Example 4 had an interfacial tension with a particular crude oil from Xinjiang (with an apparent viscosity of 18 mPa·s) at 80° C. of 0.045 mN/m and 0.025 mN/m, respectively. The experimental results suggest the non-ionic nanoemulsion system has ultra-low interfacial tension with a crude oil, showing substantial superiority.

Figure 12:
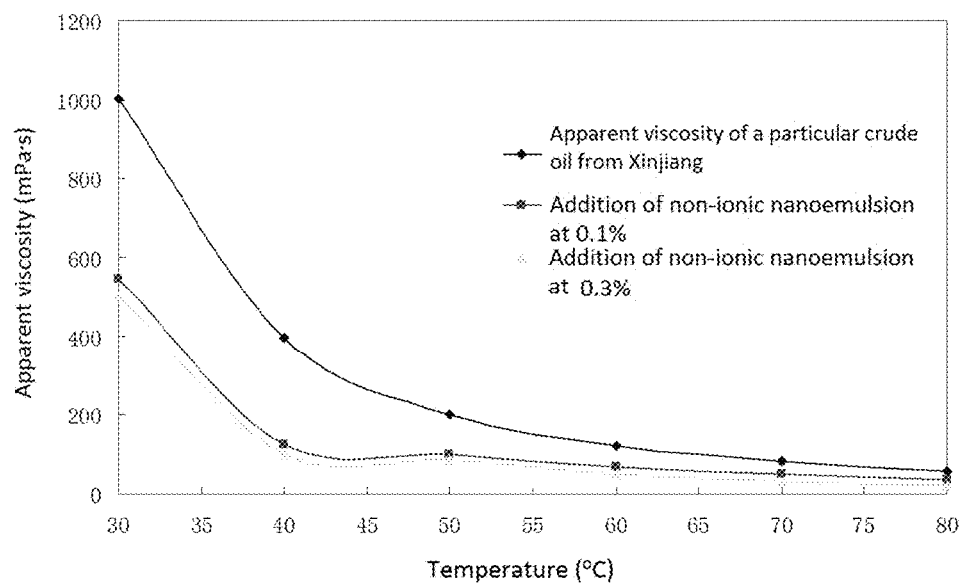
FIG. 12 is a graph showing the effect of the non-ionic nanoemulsions prepared in Example 4 on reducing the viscosity of a particular crude oil from Xinjiang.

(3) The effect of the non-ionic nanoemulsion systems having a mass concentration of 0.1% and 0.3% prepared in Example 4 on reducing the viscosity of a particular crude oil from Xinjiang (see FIG. 12) was determined by a rheometer (RS600, Huck Inc., Germany) The experimental results suggest that the non-ionic nanoemulsion system has an average viscosity-reducing efficiency of 58% for the particular crude oil from Xinjiang, and thus has a good viscosity-reducing effect and shows substantial superiority.

It will be apparent that the above-described examples of the present invention are merely exemplified for a clear illustration of the present invention and not intended to limit the embodiments of the present invention. For those of ordinary skills in the art, various other types of variations or modifications may also be made on the basis of the above description. The embodiments herein are by no means exhaustive, and any obvious variations or modifications extended from the technical solutions of the present invention are intended to be within the scope of the present invention.

What is claimed is:

1. A core-shell structured non-ionic nanoemulsion system, wherein the system comprises: a non-ionic Gemini surfactant, an oil phase material, a solubilizer, and water;
wherein the microemulsion has a core-shell structure, with the outer shell being the non-ionic Gemini surfactant and the inner core being the oil phase material; and
the non-ionic Gemini surfactant is di(octylphenol polyoxyethylene ether)-substituted dicarboxylic acid diphenyl ether having the structure formula:

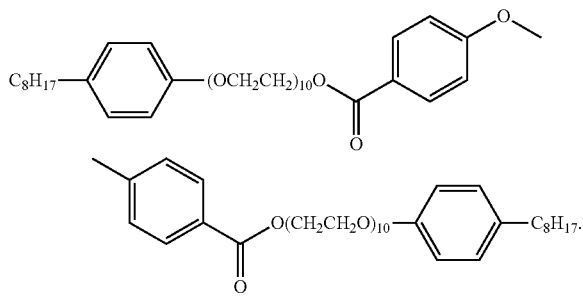

2. The non-ionic nanoemulsion system according to claim 1, wherein the microemulsion has a droplet size ranging from 3 nm to 40 nm.

3. The non-ionic nanoemulsion system according to claim 1, wherein the microemulsion has an effective concentration of 0.05% to 0.5%, wherein the effective concentration is the total concentration of the non-ionic Gemini surfactant, the oil phase material, and the solubilizer.

4. The non-ionic nanoemulsion system according to claim 3, wherein in the system, the non-ionic Gemini surfactant accounts for 10% to 75% by mass, the oil phase material accounts for 5% to 25% by mass, and the solubilizer accounts for 10% to 32% by mass.

5. The non-ionic nanoemulsion system according to claim 1, wherein the oil phase material is selected from an aromatic hydrocarbon compound, a heterocyclic compound, a terpene compound, or a combination thereof.

6. The non-ionic nanoemulsion system according to claim 5, wherein the oil phase material is selected from xylene, pyrrolidone, menthol, alpha-pinene, beta-laurene, limonene, or a combination thereof.

7. The non-ionic nanoemulsion system according to claim 1, wherein the solubilizer is selected from one or more small molecule alcohol compounds.

8. The non-ionic nanoemulsion system according to claim 7, wherein the solubilizer is selected from ethanol, propanol, isopropanol, ethylene glycol, butanol, pentanol, or combinations thereof.

9. The non-ionic nanoemulsion system according to claim 1, wherein non-ionic nanoemulsion system further comprises an inorganic salt, wherein the inorganic salt is NaCl.

10. The non-ionic nanoemulsion system according to claim 9, wherein the inorganic salt has a mass content of 0 to 20%, not including 0.

11. A preparation method of the non-ionic nanoemulsion system according to claim 1, wherein the method comprises:
S1, mixing a non-ionic Gemini surfactant, an oil phase material, a solubilizer, and water uniformly to obtain a homogeneous mixed solution; or
mixing a non-ionic Gemini surfactant, an oil phase material, and a solubilizer uniformly to obtain a homogeneous mixed solution; and
S2, diluting the homogeneous mixed solution with water or an inorganic salt brine to a low concentration condition, so as to obtain the core-shell structured non-ionic nanoemulsion system.

12. The preparation method according to claim 11, wherein the homogeneous mixed solution in S1 comprises by mass: 10% to 60% of the non-ionic Gemini surfactant, 5% to 20% of the oil phase material, 10% to 25% of the solubilizer, and a balance of water.

13. The preparation method according to claim 11, wherein the low concentration condition is an effective microemulsion concentration of 0.05% to 0.5%.

14. The preparation method according to claim 11, wherein the oil phase material is selected from an aromatic hydrocarbon compound, a heterocyclic compound, a terpene compound, or a combination thereof.

15. The preparation method according to claim 11, wherein the oil phase material is selected from xylene, pyrrolidone, menthol, alpha-pinene, beta-laurene, limonene, or a combination thereof.

16. The preparation method according to claim 11, wherein the solubilizer is selected from ethanol, propanol, isopropanol, ethylene glycol, butanol, pentanol, or a combination thereof.

17. The preparation method according to claim 11, wherein in S2, the inorganic salt brine is used for diluting, and the obtained non-ionic nanoemulsion system has an inorganic salt mass content of 0 to 20%, excluding 0.

18. The preparation method according to claim 11, wherein the microemulsion in the non-ionic nanoemulsion system has a droplet size ranging from 3 nm to 40 nm.

19. The preparation method according to claim 11, wherein the mixing and diluting are carried out under stirring at 10 rpm to 400 rpm.

20. Use of the non-ionic nanoemulsion system according to any one of claim 1 in the exploitation of low permeability, extra/ultra-low permeability, dense, and shale oils and gases.

* * * * *